US008145818B2

(12) United States Patent
Murayama et al.

(10) Patent No.: US 8,145,818 B2
(45) Date of Patent: Mar. 27, 2012

(54) ACCESS RIGHT MANAGING METHOD FOR ACCESSING MULTIPLE PROGRAMS

(75) Inventors: Koichi Murayama, Kawasaki (JP); Yuichi Yagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/107,028

(22) Filed: May 13, 2011

(65) Prior Publication Data

US 2011/0219119 A1     Sep. 8, 2011

Related U.S. Application Data

(63) Continuation of application No. 12/491,802, filed on Jun. 25, 2009, now Pat. No. 8,010,725, which is a continuation of application No. 11/633,535, filed on Dec. 5, 2006, now Pat. No. 7,743,190.

(30) Foreign Application Priority Data

Oct. 10, 2006  (JP) .................................. 2006-276745

(51) Int. Cl.
    G06F 15/16          (2006.01)
(52) U.S. Cl. ....................................... 710/240; 709/217
(58) Field of Classification Search .................. 710/240; 709/217, 225, 229; 711/111, 152, 145; 707/1
    See application file for complete search history.

(56) References Cited

U.S. PATENT DOCUMENTS

| 5,450,593 | A | 9/1995 | Howell et al. |
| 5,701,462 | A | 12/1997 | Whitney et al. |
| 5,706,501 | A | 1/1998 | Horikiri et al. |
| 5,872,936 | A | 2/1999 | Eckstein |
| 5,970,232 | A | 10/1999 | Passint et al. |
| 6,003,061 | A | 12/1999 | Jones et al. |
| 6,219,771 | B1 | 4/2001 | Kikuchi et al. |
| 6,618,778 | B1 | 9/2003 | MacCormack |
| 6,820,122 | B1 | 11/2004 | Mandler et al. |
| 6,826,580 | B2 | 11/2004 | Harris et al. |
| 6,917,365 | B2 | 7/2005 | Riemens et al. |
| 6,950,943 | B1 | 9/2005 | Bacha et al. |
| 6,978,329 | B1 | 12/2005 | Harral |
| 7,051,121 | B2 | 5/2006 | Ohno et al. |
| 7,100,016 | B2 | 8/2006 | Yamamoto et al. |
| 7,134,048 | B2 | 11/2006 | Taguchi |
| 7,178,021 | B1 | 2/2007 | Hanna et al. |

(Continued)

FOREIGN PATENT DOCUMENTS

JP       2002-202914        7/2002

(Continued)

*Primary Examiner* — Paul R Myers
(74) *Attorney, Agent, or Firm* — Antonelli, Terry, Stout & Kraus, LLP.

(57) ABSTRACT

Provided is an access right managing method for a resource of a storage system, in which a management computer stores access right definition information of the resource, and resource correspondence information including information on a management program which manages another resource related to the resource managed by the management program. In case of which receiving an updating request of an access right of the resource, the management computer updates an access right based on the updating request of the access right, selects a management program of the resource whose access right is requested to be updated based on the resource correspondence information, transmits an updating request of an access right for a relative resource to a management computer which executes the selected management program, and in case of which the access right updating request of the related resource is received, updates the access right of the relative resource.

22 Claims, 18 Drawing Sheets

U.S. PATENT DOCUMENTS

| | | |
|---|---|---|
| 7,194,575 B2 | 3/2007 | Nakanishi et al. |
| 7,197,489 B1 | 3/2007 | Gauvin et al. |
| 7,234,020 B2 | 6/2007 | Akagawa et al. |
| 7,350,237 B2 | 3/2008 | Vogel et al. |
| 7,380,267 B2 | 5/2008 | Arai et al. |
| 7,913,300 B1 * | 3/2011 | Flank et al. .................... 726/12 |
| 7,949,871 B2 * | 5/2011 | Randle et al. ................ 713/153 |
| 2002/0104008 A1 | 8/2002 | Cochran et al. |
| 2003/0014600 A1 | 1/2003 | Ito et al. |
| 2003/0220991 A1 | 11/2003 | Soejima et al. |
| 2005/0091333 A1 | 4/2005 | Kobayashi et al. |
| 2006/0026016 A1 | 2/2006 | Honda et al. |
| 2006/0036736 A1 | 2/2006 | Kitamura et al. |
| 2006/0101399 A1 | 5/2006 | Murayama et al. |
| 2006/0294103 A1 | 12/2006 | Wood |
| 2007/0033654 A1 | 2/2007 | Wilson |
| 2009/0276771 A1 | 11/2009 | Nickolov et al. |

FOREIGN PATENT DOCUMENTS

| | | |
|---|---|---|
| JP | 2003-030053 | 1/2003 |
| JP | 2004-192601 | 7/2004 |
| JP | 2004-303023 | 10/2004 |
| JP | 2004-318741 | 11/2004 |
| JP | 2005-128731 | 5/2005 |

* cited by examiner

Ta1

| PROGRAM A, ACL (Ta11, Ta12, Ta13) | | |
|---|---|---|
| USER ID | AUTHORITY | RESOURCE GROUP |
| system_admin | ALL AUTHORITY | ALL RESOURCES |
| storage_admin1 | modify, view | PAIR GROUP 1 |
| storage_admin2 | view | PAIR GROUP 2 |
| ... | ... | ... |

| PROGRAM A, RESOURCE GROUP DEFINITION (Ta21, Ta22) | |
|---|---|
| RESOURCE GROUP | STRUCTURE RESOURCE |
| PAIR GROUP 1 | A1-B1 |
| PAIR GROUP 2 | A2-B2<br>A3-B10 |
| ... | ... |

FIG. 3B

| | PROGRAM B1, ACL | |
|---|---|---|
| USER ID | AUTHORITY | RESOURCE GROUP |
| storage_admin1 | modify, view | RESOURCE GROUP 1A |
| storage_admin2 | view | RESOURCE GROUP 2A |
| ... | ... | ... |

*FIG. 4A*

| PROGRAM B1, RESOURCE GROUP DEFINITION | |
|---|---|
| RESOURCE GROUP | STRUCTURE RESOURCE |
| RESOURCE GROUP 1A | a1,a2 |
| RESOURCE GROUP 2A | a10,a11,a12,... |
| ... | ... |

| PROGRAM B2, ACL |||
|---|---|---|
| USER ID | AUTHORITY | RESOURCE GROUP |
| storage_admin1 | modify, view | RESOURCE GROUP 1B |
| storage_admin2 | view | RESOURCE GROUP 2B |
| ... | ... | ... |

| PROGRAM B2, RESOURCE GROUP DEFINITION ||
|---|---|
| RESOURCE GROUP | STRUCTURE RESOURCE |
| RESOURCE GROUP 1B | b1,b2 |
| RESOURCE GROUP 2B | b3,b4,b5,... |
| ... | ... |

FIG. 4D

| PROGRAM A, ACL | | |
|---|---|---|
| USER ID | AUTHORITY | RESOURCE |
| system_admin | ALL AUTHORITY | ALL RESOURCES |
| storage_admin1 | modify, view | a1 |
| | modify, view | b1 |
| storage_admin2 | view | a2 |
| | view | a3 |
| | view | b2 |
| | ... | ... |
| ... | ... | ... |

*FIG. 5A*

| PROGRAM B1, ACL | | |
|---|---|---|
| USER ID | AUTHORITY | RESOURCE |
| system_admin | ALL AUTHORITY | ALL RESOURCES |
| storage_admin1 | modify, view | a1 |
| | modify, view | a2 |
| storage_admin2 | view | a10 |
| | view | a11 |
| | view | a12 |
| | ... | ... |
| ... | ... | ... |

*FIG. 5B*

| PROGRAM B2, ACL | | |
|---|---|---|
| USER ID | AUTHORITY | RESOURCE |
| system_admin | ALL AUTHORITY | ALL RESOURCES |
| storage_admin1 | modify, view | b1 |
| | modify, view | b2 |
| storage_admin2 | view | b3 |
| | view | b4 |
| | view | b5 |
| | ... | ... |
| ... | ... | ... |

| PROGRAM A, RESOURCE CORRESPONDENCE TABLE | | | | |
|---|---|---|---|---|
| OWN PROGRAM | | INTERCONNECTION PROGRAM | | |
| MANAGEMENT RESOURCE | RELATIVE RESOURCE | PROGRAM NAME | HOST | SITE |
| A1 | a1,a2 | PROGRAM B1 | HOST 1 | A |
| B1 | b1,b2 | PROGRAM B2 | HOST 2 | B |
| PAIR 1 | PAIR 1 | OWN PROGRAM | HOST 1 | A |
| ... | ... | ... | ... | ... |

| | | PROGRAM B1, RESOURCE CORRESPONDENCE TABLE | | | |
|---|---|---|---|---|---|
| OWN PROGRAM | INTERCONNECTION PROGRAM | | | | |
| MANAGEMENT RESOURCE | RELATIVE RESOURCE | PROGRAM NAME | HOST | DOMAIN | |
| a1 | b1 | PROGRAM B2 | HOST 2 | B | |
| a2 | b2 | PROGRAM B2 | HOST 2 | B | |
| a3 | b10 | PROGRAM B2 | HOST 2 | B | |
| a4 | a10 | OWN PROGRAM | HOST 1 | A | |
| ... | ... | ... | ... | ... | |

*FIG. 16*

ACCESS RIGHT MANAGING METHOD FOR ACCESSING MULTIPLE PROGRAMS

CROSS-REFERENCE TO RELATED APPLICATIONS

This application is a continuation of U.S. application Ser. No. 12/491,802, filed Jun. 25, 2009 (now U.S. Pat. No. 8,010,725), which, in turn, is a continuation of U.S. Ser. No. 11/633,535, filed Dec. 5, 2006 (now U.S. Pat. No. 7,743,190), the entire contents of which are hereby incorporated by reference.

CLAIM OF PRIORITY

The present application claims priority from Japanese patent application 2006-276745 filed on Oct. 10, 2006, the content of which is hereby incorporated by reference into this application.

BACKGROUND

This invention relates to a technique for managing access rights of resources of a storage system. More specifically, this invention relates to a technique for maintaining a matching characteristic as to access rights set in a plurality of managing programs.

In recent years, since quantities of logical volumes managed by storage systems (disk array systems) are increased, and high functional performance and various sorts of functions are provided by these storage systems, various sorts of storage management programs capable of supporting system operation management are required.

Since various sorts of these management programs are provided, there are increasing cases where a plurality of management programs are utilized at the same time. Then, access rights of users which are defined in each of these management programs are required to be set for every management program, so that setting operations become cumbersome. As a result, human errors may easily occur, and thus, matching characteristics as to access rights among these programs can be hardly maintained. Accordingly, there is such a risk that security levels are lowered.

As means for solving the above-explained problem, the following technical idea has been disclosed (refer to JP 2004-303023 A). In other words, since access rights for a plurality of programs are managed in a concentrated manner, setting cost of an administrator may be saved, and a system having a high security level may be provided.

SUMMARY

However, the technical idea disclosed in JP 2004-303023 A cannot be applied to such a case where the programs can be hardly unified, for instance, the programs are dispersed in remote places. Also, the technical idea disclosed in JP 2004-303023 A cannot be applied to such a case where access control units are different from each other among these programs. For instance, with respect to a program "A" in which volumes are managed in the unit of a pair and in another program "B" which manages structures and attributes of volumes provided by a storage system, there are some possibilities that an access control operation is executed in the pair unit within the program "A", whereas an access control operation is carried out in the volume unit within the program "B."

As previously explained, since the large-scaled information systems operable in the various manners are developed while the structures of the logical volumes of these information systems are dispersed, such a case where the access rights cannot be unified is increased, so that an access control list (hereinafter referred to as "ACL") must be set with respect to each of the programs.

It is therefore an object of this invention to provide an ACL management technique capable of setting access rights without any contradiction even when ACLs are dispersed to be arranged in remote places, and further capable of being adapted to such a case where access control units are different from each other.

According to a representative aspect of the present invention, there is provided an access right managing method used in a computer system including a storage system and a management computer for managing the storage system, for managing an access right of a resource of the storage system, the management computer including an interface connected to the storage system, a processor connected to the interface, and a memory connected to the processor, the method including:

storing, in the memory, a management program for managing the resource of the storage system, access right definition information for defining the access right of the resource managed by the management program, and resource correspondence information which includes a correlation among the resource, another resource related to the resource, and information on a management program for managing the another resource related to the resource managed by the management program;

updating, by the processor, in case of which the processor receives an updating request for the access right of the resource managed by the management program, the access right of the resource which is required to be updated based on the received updating request for the access right of the resource;

selecting, by the processor, a management program corresponding to the resource whose access right is required to be updated based on the resource correspondence information;

specifying, by the processor, based on the resource correspondence information, a resource which is managed by the selected management program and is related to the resource whose access right is required to be updated;

transmitting, by the processor, an access right updating request for the specified relative resource to the management computer for executing the selected management program; and updating, by the processor, in case of which the processor of the management computer for executing the selected management program receives the access right updating request for the specified relative resource, the access right of the specified relative resource based on the received updating request.

According to an aspect of this invention, when an access right of a resource managed by a certain management program is updated, an access right of a resource related thereto is also updated in interconnection with the above-described access right updating operation. As a consequence, consistency of the access right can be secured.

BRIEF DESCRIPTION OF THE DRAWINGS

The present invention can be appreciated by the description which follows in conjunction with the following figures, wherein:

FIG. 3A is a diagram for explaining a structure of the access control list of the management program Pa1 according to the first embodiment;

FIG. 3B is a diagram for explaining a structure of the resource group definition of the management program Pa1 according to the first embodiment;

FIG. 4A is a diagram for explaining an ACL of the management program Pb1 according to the first embodiment;

FIG. 4B is a diagram for explaining a resource group definition of the management program Pb1 according to the first embodiment;

FIG. 4C is a diagram for explaining an ACL of the management program Pb2 according to the first embodiment;

FIG. 4D is a diagram for explaining a resource group definition Tb22 of the management program Pb2 according to the first embodiment;

FIG. 5A is a diagram for explaining an ACL which manages access rights for every resource of the management program Pa1 according to the first embodiment;

FIG. 5B is a diagram for explaining an ACL which manages access rights for every resource of the management program Pb1 according to the first embodiment;

FIG. 5C is a diagram for explaining an ACL which manages access rights for every resource of the management program Pb2 according to the first embodiment;

FIG. 6 is a diagram for explaining a structure of a resource correspondence table contained in the management program Pa1 according to the first embodiment;

FIG. 16 is a diagram for explaining a structure of a resource correspondence table contained in the management program PM according to the second embodiment.

DETAILED DESCRIPTION OF THE PREFERRED EMBODIMENTS

Referring now to the accompanying drawings, various embodiments of this invention will be described.

First Embodiment

Figure 1:
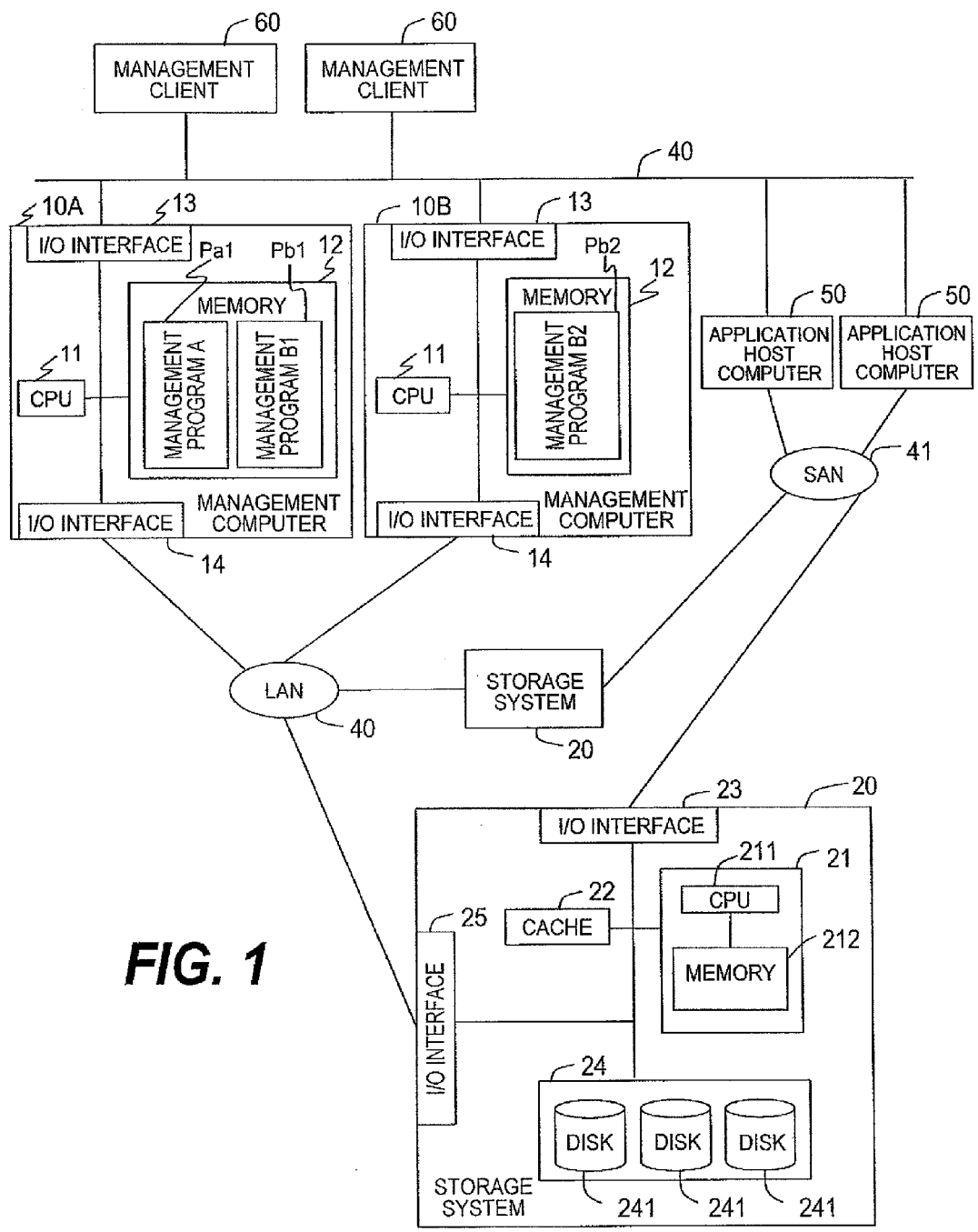
FIG. 1 is a diagram for representing an arrangement of a computer system according to a first embodiment of this invention.

FIG. 1 is a diagram for representing an arrangement of a computer system according to a first embodiment. The computer system of the first embodiment contains management computers 10A and 10B, a management client 60, an application host computer 50, and a storage system 20. Although the management computers 10A and 10B, the management client 60, the application host computer 50, and the storage system 20, which constitute the computer system, have been arranged in two sets of each apparatus, these apparatuses may be alternatively arranged in the unit of 1 set or multiple sets. It should be understood that an expression of "management computer 10" is used when a content commonly used for both the management computer 10A and the management computer 10B is described.

The management computer 10, the management client 60, the storage system 20, and the application host computer 50 are connected to each other by a management network 40. The application host computer 50 is connected via a data network 41 to the storage system 20. The data network 41 is, for example, a storage area network (SAN).

The management computer 10 manages the storage system 20. Specifically speaking, the management computer 10 forms volumes of the storage system 20, allocates volumes with respect to the application host computer 50, and copies volumes within the storage system 20, or copies volumes between the storage systems 20. The management computer 10 is equipped with a CPU 11, a memory 12, a front-end I/O interface 13, and a rear-end I/O interface 14. The CPU 11, the memory 12, the front-end I/O interface 13, and the rear-end I/O interface 14 are connected via a bus to each other.

The CPU 11 corresponds to a calculation processing apparatus for executing various sorts of programs, or various sorts of modules stored in the memory 12. The memory 12 corresponds to a so-called "internal storage system" which contains a non-volatile memory and a volatile memory. The non-volatile memory stores therein various sorts of modules, and the like. The volatile memory temporarily stores therein a calculation processing result, and the like. A management program is stored in the memory 12 of the management computer 10.

The management client 60 transmits a process request with respect to a management program executed in the management computer 10 in response to a request issued from an administrator. The management client 60 receives an execution result of the management program, and displays the result to the administrator by employing either a graphic user interface (GUI) or a command line interface (CLI). It should be noted that since the management client 60 is provided with the same structure as that of the management computer 10, explanations thereof are omitted.

The application host computer 50 executes an application program such as a database management system (DBMS).

The application host computer 50 writes a process result into the storage system 20, or acquires an information resource stored in the storage system 20. The application host computer 50 is connected via the data network 41 to the storage system 20. The data network 41 is communicated according to a communication protocol such as a fiber channel, or an iSCSI. It should be noted that since the application host computer 50 is provided with the same structure as that of the management computer 10, explanations thereof are omitted.

The storage system 20 provides a storage area with respect to the application host computer 50. The storage system 20 is equipped with a disk array controller 21, a cache 22, a data-purpose I/O interface 23, a plurality of disk drives 24, and a management-purpose I/O interface 25.

The disk array controller 21 corresponds to a control module which executes various sorts of control process operations with respect to the storage system 20. The disk array controller 21 is equipped with a CPU 211, a memory 212, and an I/O port. The cache 22 temporarily stores therein data which should be written with respect to the disk drive 24, or data acquired from the disk drive 24.

The disk drive 24 corresponds to a disk array system in which a RAID system is arranged by a plurality of magnetic disk drives. The disk drive 24 provides either one or multiple logic units (LUs) by a plurality of hard disk drives 241, or provides either one or multiple storage areas, namely, logic units (LUs) by one hard disk drive.

Figure 2:
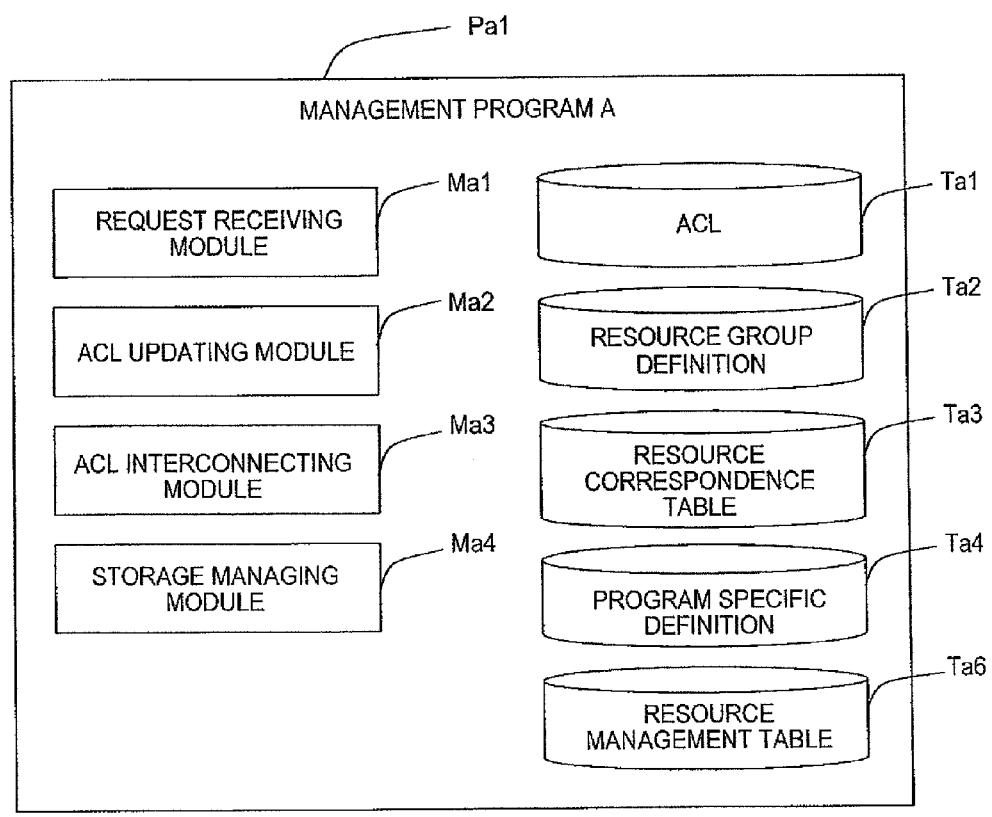
FIG. 2 is a diagram for explaining a structure of a management program which is stored in the memory of the management computer according to the first embodiment.

FIG. 2 is a diagram for explaining a structure of a management program which is stored in the memory 12 of the management computer 10 according to the first embodiment. Management programs Pa1 and Pb1 are stored in the memory 12 of the management computer 10A. A management program Pb2 is stored in the memory 12 of the management computer 10B.

The management program Pa1 is constituted by a module portion for executing a process operation, and a data portion for storing therein resource management information, definitions of access rights, and the like. The module portion contains a request receiving module Ma1, an ACL updating module Ma2, an ACL interconnecting module Ma3, and a storage managing module Ma4. The data portion contains an access control list (ACL) Ta1, a resource group definition Ta2, a resource correspondence table Ta3, a program specific definition Ta4, and a resource management table Ta6.

In the first embodiment, the management program Pa1 provides a predetermined function to the storage system 20 in interconnection with both the management programs Pb1 and Pb2. For instance, both the management programs Pb1 and Pb2 correspond to storage management programs which manage structures of LUs provided by the storage system 20, and provide such functions of allocating LUs and of changing LU attributes. At this time, while the management program Pa1 utilizes the functions provided by the management programs Pb1 and Pb2, the management program Pa1 provides a function capable of copying data among volumes.

The structures of the management programs Pb1 and Pb2 are identical to a structure of the management program Pa1. As explained in the first embodiment, in such a case where the management program Pa1 corresponds to an upper grade of management programs which utilizes the functions of the management programs Pb1 and Pb2, only the management program Pa1 may be alternatively provided with the resource correspondence table Ta2.

The request receiving module Ma1 accepts an ACL updating request issued from the administrator, and transmits the received ACL updating request to the ACL interconnecting module Mb3. An ACL updating request is authority for accessing a resource by a user registered in the ACL, or is such a request for changing an execution right of operation with respect to a resource.

A resource contains a logical volume and a port which are provided by the storage system 20. Alternatively, a resource group which groups a plurality of logical volumes, and a copy group which groups logical volumes in accordance with attributes of copies may be used as a resource. In the first embodiment, while both logical volumes and ports are used as a resource, grouped resources are employed as a resource group. As a consequence, the above-described copy group is also classified into a resource group.

The ACL updating module Ma2 updates the ACL (Ta1) based on the ACL updating request accepted by the request receiving module Ma1, and notifies an update result to either the administrator or a calling source program.

The ACL interconnecting module Ma3 acquires information as to a user and a resource which constitute a subject from the ACL updating request accepted by the request receiving module Ma1, and transmits the ACL updating request with respect to the management programs Pb1 and Pb2. When such a resource managed by another management program Pb1, or Pb2 is contained in a resource designated by the ACL updating request, the ACL interconnecting module Ma3 transmits the ACL updating request to either the management program Pb1 or the management program Pb2. The ACL interconnecting module Ma3 notifies a result of the ACL updating request to either the administrator or the calling source program.

The storage management module Ma4 executes a storage management function which manages the storage system 20. The storage management function corresponds to, for instance, a control function and a monitoring function of a data replication, and a function for managing a structure of a storage system.

The ACL (Ta1) is an access control list of the management program Pa1. The ACL (Ta1) stores authority of users who execute the management program Pa1. A detailed content of the ACL (Ta1) will be explained with reference to FIG. 3A.

FIG. 3A is a diagram for explaining a structure of the access control list of the management program Pa1 in the first embodiment. The ACL (Ta1) contains a user ID (Ta11), authority Ta12, and a resource group Ta13.

The user ID (Ta11) corresponds to an identifier of a user account which should be access-controlled. The authority Ta11 defines an operation which can be executed with respect to the resource group Ta13 by a user specified by the user ID (Ta11). Specifically speaking, the value "modify" indicates authority capable of executing an operation of an updating system with respect to a resource for constituting a subject. The value "view" shows authority capable of executing an operation of a reference system. The value "all authority" indicates authority capable of executing all of operations.

The resource group Ta13 corresponds to a set of resources made by grouping either a portion or all of resources managed by the management program Pa1. Values stored in the resource group Ta13 are separately defined by the resource group definition Ta2, and a detailed content thereof will be explained with reference to FIG. 3B. Referring now to FIG. 3A, a user ID "storage_admin1" can be changed and referenced with respect to a resource group contained in the pair group 1.

The resource group definition Ta2 defines a relationship between the resource group and the resources. The resource group includes one or more pieces of resources. A detailed content of the resource group definition Ta will be explained with reference to FIG. 3A.

FIG. 3B is a diagram for explaining a structure of the resource group definition Ta2 of the management program Pa1 of the first embodiment. The resource group definition Ta2 contains a resource group Ta21 and a structural resource Ta22.

A resource group Ta21 corresponds to either a title or an identifier which exclusively identifies a resource group. A structural resource Ta22 corresponds to either a title or an identifier which exclusively identifies a resource group, or a resource which constructs a resource group.

Since access rights are set in correspondence with users and resource groups, the ACL (Ta1) can apply access rights with respect to all of resources contained in the resource groups. When a large amount of resources are present to which access rights must be set, the access rights can be set to the resources contained in the resource group in a batch manner, and the access rights can be easily managed.

FIG. 4A is a diagram for explaining an ACL (Tb11) of the management program Pb1 of the first embodiment in detail. A structure of the ACL (Tb11) is identical to that of the ACL (Ta1) of the management program Pa1.

FIG. 4B is a diagram for explaining a resource group definition Tb12 of the management program Pb1 of the first embodiment in detail. A structure of the resource group definition Tb12 is identical to that of the resource group definition (Ta2) of the management program Pa1.

FIG. 4C is a diagram for explaining an ACL (Tb21) of the management program Pb2 of the first embodiment in detail. A structure of the ACL (Tb21) is identical to that of the ACL (Ta1) of the management program Pa1.

FIG. 4D is a diagram for explaining a resource group definition Tb22 of the management program Pb2 of the first embodiment in detail. A structure of the resource group definition Tb22 is identical to that of the resource group definition (Ta2) of the management program Pa1.

It should also be noted that users who are to be registered in the ACLs (Tb11, Tb21) of the management program Pb1 and the management program Pb2 must be previously registered in the respective management programs.

It should also be understood that the ACL (Ta1) may be alternatively arranged in such a manner that an access right is set in the unit of a resource without employing a resource group. FIG. 5A to FIG. 5C are diagrams for showing one example of ACLs in which access rights are set in the unit of a resource.

FIG. 5A is a diagram for explaining an ACL (Ta5) which manages access rights for every resource of the management program Pa1 of the first embodiment. Although a structure of the ACL (Ta5) is substantially similar to that of the ACL (Ta1) shown in FIG. 3A, a resource Ta53 is contained instead of the resource group Ta13. When an access right is set for every resource, a record is produced for every resource, and a correlation between the authority and the produced resource is set.

FIG. 5B is a diagram for explaining an ACL (Ta15) which manages access rights for every resource of the management program Pb1 of the first embodiment. Similarly, FIG. 5C is a diagram for explaining an ACL (Tb25) which manages access rights for every resource of the management program Pb2 of the first embodiment.

A resource correspondence table Ta3 corresponds to a table which manages a correlation between resources managed by the own program and resources managed by another program in relation to the resources managed by the own program. A detailed content of the resource correspondence table Ta3 will be explained with reference to FIG. 6.

FIG. 6 is a diagram for explaining a structure of the resource correspondence table Ta3 contained in the management program Pa1 of the first embodiment. The resource correspondence table Ta3 contains a management resource Ta31 of the own program, a relative resource Ta32, a program name Ta33, a host Ta34, and a domain Ta35 of the interconnection program.

The management resource Ta31 corresponds to an identifier of a resource which is managed by the own program, and to the structural resource Ta22 of the resource group definition Ta2. The relative resource Ta32 is related to the management resource Ta31, and corresponds to an identifier of a relative resource which is managed by another management program. The program name Ta33 corresponds to either a name or an identifier, which exclusively identifies a management program for managing the relative resource Ta32. The host Ta34 corresponds to either a host name or an IP address of the management computer 10 by which the management program Ta33 is executed. The domain Ta35 corresponds to a site to which the management program Ta33 belongs. The site is defined based on either a section of a management network or a section of an organization. When a relationship of resource groups among products may be previously defined, the resource groups are regarded as one resource, and the correlation may be alternatively defined by employing the identifier of the resource groups with respect to either the management resource Ta31 or the relative resource Ta32.

The resource management table Ta6 stores therein resources which are managed by the management program Pa1. Specifically speaking, the contents stored in this resource management table Ta6 are identical to the contents stored in the management resource Ta31 of the resource correspondence table Ta3. As a consequence, instead of the resource management table Ta6, the resource correspondence table Ta3 may be used.

Next, a description is made of a process operation for setting an access right of the first embodiment. Firstly, referring to FIG. 7, a process operation of the first embodiment will be summarized.

Figure 7:
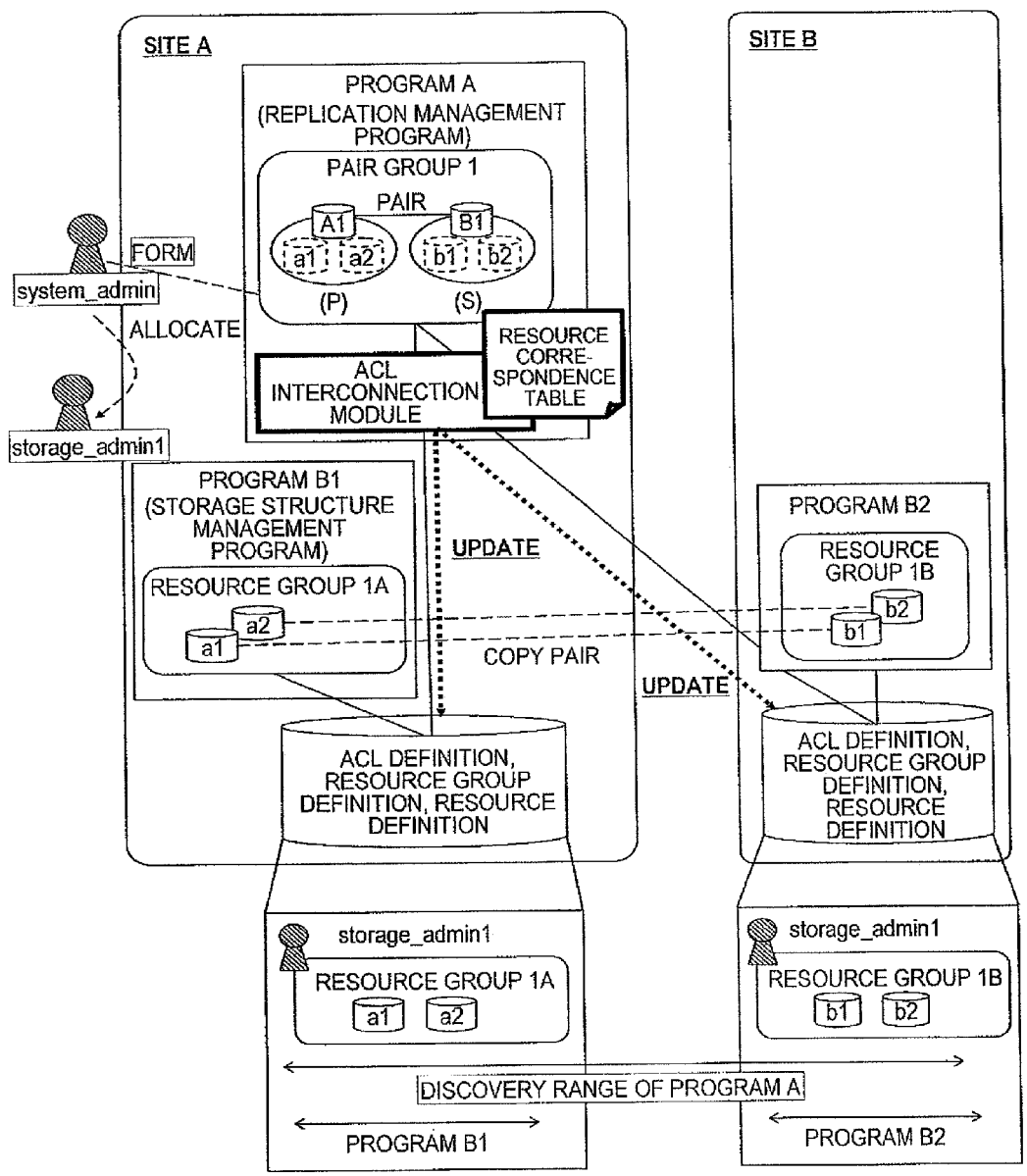
FIG. 7 is a diagram for schematically showing a process operation for setting the access right according to the first embodiment.

FIG. 7 is a diagram for schematically showing the process operation for setting the access right of the first embodiment. In the first embodiment, when both the management programs Pb1 and Pb2 correspond to a storage structural management program, the management program Pa1 may become a replication management program which executes a replication function in interconnection with both the management programs Pb1 and Pb2.

In a summary of the process operation, when a system administrator (system_admin) updates an access right of a storage administrator (storage_admin1) registered in the ACL (Ta1) of the management program Pa1, the system administrator updates the ACLs of the management programs Pb1 and Pb2 which manage a resource to be updated and another resource related to the resource to be updated.

A specific explanation is made of process operations when the system administrator registers a pair group 1 and applies an access right to a storage administer. Firstly, the system administrator selects a logical volume formed in the storage system 20 so as to form a pair group 1. Next, the system administrator sets an access right of the pair group 1 with respect to the storage administrator.

The management program A refers to the resource correspondence table Ta3 so as to specify a relative resource. This relative resource is defined as follows. In other words, for example, when the pair group 1 is constituted by logical volumes A1 and B1, and furthermore, the logical volume A1 is arranged by physical storage systems a1 and a2, and the logical volume B1 is arranged by the physical storage systems b1 and b2, resources which are related to the pair group 1 constitute A1, B1, a1, a2, b1, and b2.

The management program A transmits an ACL updating request to both the management program B1 which manages the storage systems a1 and a2, and the management program B2 which manages the storage systems b1 and b2. Upon receipt of the ACL updating request, the management programs B1 and B2 update the ACLs based on the ACL updating request, and send update results to the management program A. Then, the management program A displays the update result on the management client 60, and accomplishes the process operation.

The above-explained process operations are arranged by a process operation by which the system administrator acquires (updates) resource information constituting a management subject of a management program, and another process operation by which the system administrator applies access rights as to the resource acquired (updated) by the system administrator with respect to the respective storage administrator. These process operations are executed in an independent manner.

Figure 8:
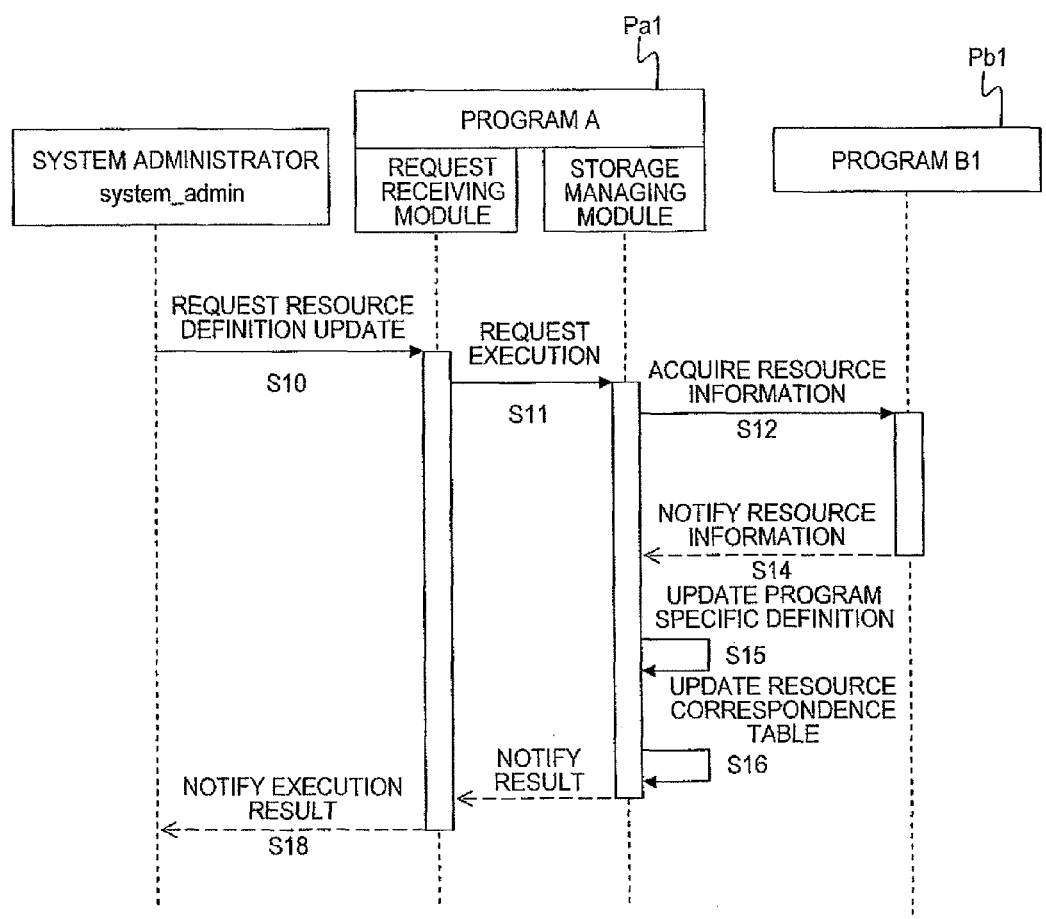
FIG. 8 is a sequential diagram for indicating a resource definition updating process operation by which the administrator acquires resource information constituting a management subject of the management program Pa1, and updates the resource correspondence table of the management program Pa1 according to the first embodiment.

FIG. 8 is a sequential diagram for indicating a resource definition updating process operation by which the administrator acquires resource information constituting a management subject of the management program Pa1, and updates the resource correspondence table of the management program Pa1 according to the first embodiment.

In the resource definition updating process operation, the resource information is acquired, and at the same time, the resource correspondence table Ta3 is produced by either a management program stored in the management computer 10 or a program stored in the storage system 20, which are designated by the administrator.

Firstly, the administrator transmits a resource definition updating request with respect to the management program Pa1 from the management client 60 (S10). The resource definition updating request contains information which specifies an acquisition destination of the resource information. For instance, the resource definition updating request contains an IP address, or a port number of a management computer by which the program for providing the resource information is executed.

When the resource definition updating request is received by the request receiving module Ma1, the management program Pa1 executes the storage managing module Ma4 (S11). The storage managing module Ma4 acquires resource information from the designated management program Pb1 (S12).

When the resource information is notified from the management program Pb1 (S14), the storage managing module Ma4 updates the program specific definition Ta4 (S15). Furthermore, the storage managing module Ma4 updates the correlation of the resource and the information of the interconnection program with respect to the resource correspondence table Ta3 (S16). Finally, the management program Pa1 notifies an execution result to the administrator (S18). The execution result is notified by that, for example, a resource list displayed on the screen of the management client 60 is updated to become the latest status thereof.

Figure 9:
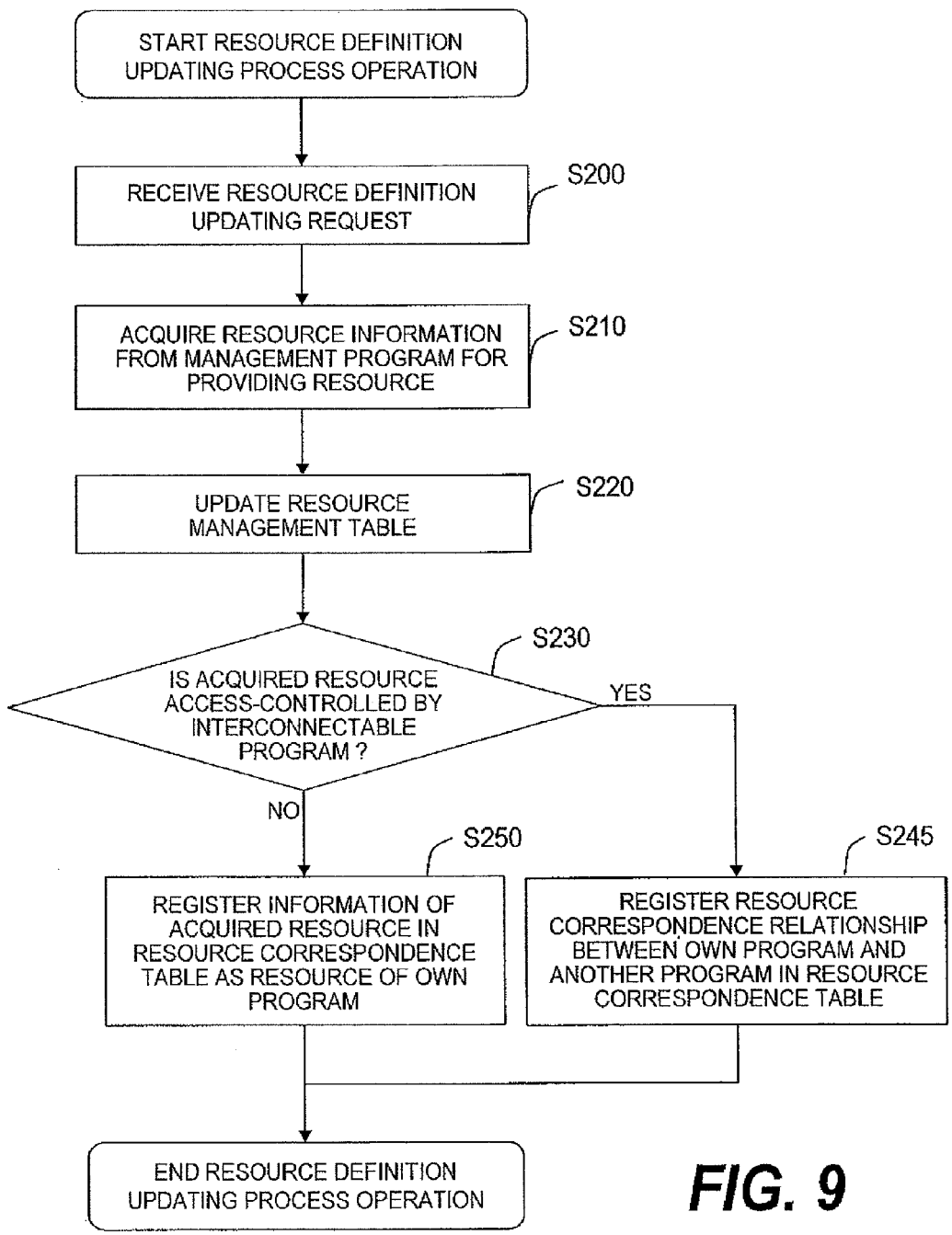
FIG. 9 is a flow chart for describing a detailed sequence as to the resource definition updating process operation according to the first embodiment.

FIG. 9 is a flow chart for describing a detailed sequence as to the resource definition updating process operation of the first embodiment.

When the management program Pa1 receives the resource definition updating request from the administrator (S200, namely, S10 of FIG. 8), the management program Pa1 acquires information of such a position that the management program for managing the resource contained in the resource definition updating request has been stored.

Next, the management program Pa1 requests resource information based on the acquired positional information with respect to the management program which manages the resources (S12 of FIG. 8), and receives the resource information (S210, namely, S14 of FIG. 8). Upon receipt of the resource information, the management program Pa1 updates the resource management table Ta6 (S220).

Subsequently, the management program Pa1 judges whether or not the acquired resource is access-controlled in accordance with the interconnection program (S230). When the acquired resource is access-controlled in accordance with the management program interconnected to management program Pa1 ("YES" in result of S230), the management program Pa1 registers a correlation into the resource correspondence table Ta3, while the correlation is related between the resource registered in the resource management table Ta6 of the own program and the resource of the acquisition destination (S245, namely, S16 of FIG. 8).

Specifically speaking, in the structure shown in FIG. 7, the resources A1 and B1 which are managed by the management program Pa1 are registered as represented in the records Ta301 and Ta302 of the resource correspondence table Ta3 of FIG. 6.

When the acquired resource is managed by the own program ("NO" in result of S230), the management program Pa1 registers the acquired resource as a resource of the own program to the resource correspondence table Ta3 (S250, namely, S16 of FIG. 8).

Specifically speaking, as shown in the record Ta303 of FIG. 6, when a pair 1 is employed as such a specific resource which is used only by the replication management by the management program Pa1, the management program Pa1 registers "pair 1" in the resource Ta32 of the interconnection program, and "own program" in the management program Ta33.

Since the above-explained process operation is carried out, the definition of the resource information is updated, and the correlation between the management program Pa1 and the resources of the interconnecting management programs Pb1 and Pb2 is registered in the resource correspondence table Ta3.

Figure 10:
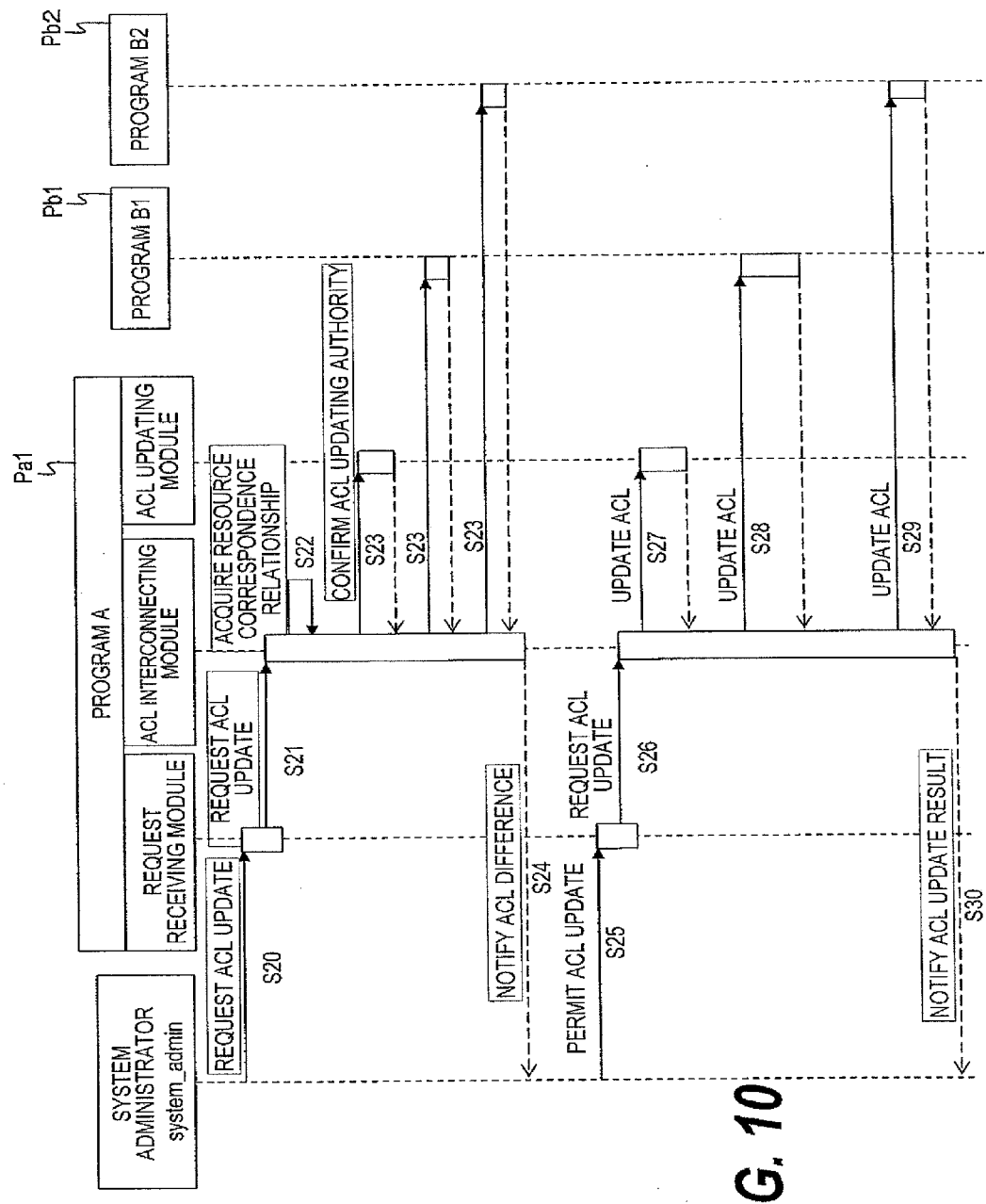
FIG. 10 is a sequential diagram for explaining a sequential operation for updating an ACL of another management program which manages a relative resource according to the first embodiment.

FIG. 10 is a sequential diagram for explaining a sequential operation for updating an ACL of another management program which manages a relative resource when the ACL of the management program Pa1 of the first embodiment is updated. This process operation is executed when the system administrator updates an access right of a user (storage administrator).

The system administrator (system_admin) transmits an ACL updating request with respect to the management program Pa1 in order to allocate an access right for a new resource to the storage administrator (storage_admin1) (S20). Upon receipt of the ACL updating request by the request receiving module Pa1, the management program Pa1 acquires a list of resources which constitute updating subjects of access rights. Thereafter, the management program Pa1 executes the ACL interconnecting module Pa3 (S21).

The ACL interconnecting module Pa3 acquires a management program based on the resource correspondence table Ta3, while this management program manages a resource contained in the list of resources contained in the ACL update request (S22). Then, the ACL interconnecting module Pa3 confirms whether or not the system administrator owns such authority for allocating an access right to the storage administrator with respect to both the own program and the respective management programs (S23).

When the system administrator owns proper authority, the ACL interconnecting module Pa3 acquires a difference between resources whose access rights are presently allocated to the storage administrator, and resources which are updated by the ACL update request. Then, the ACL interconnecting module Pa3 notifies the acquired difference to the system administrator, and confirms whether or not updating of the ACL is executed (S24).

When the system administrator confirms the updated content and permits updating of the access right, the management program Pa1 receives an ACL updating permission notification by the request receiving module Pa1 (S25). The request receiving module Pa1 transmits an ACL updating request to the ACL interconnecting module Pa3 based on the update content confirmed by the system administrator who receives the updating request (S26).

The ACL interconnecting module Pa3 requests an ACL updating operation with respect to the respective management programs which manage the resources contained in the ACL updating request in such a manner that the access rights of the relevant resources are allocated to the storage administrator (S27, S28, and S29). When the above-explained process operation is accomplished, the ACL interconnecting module Pa3 notifies an update result to the system administrator (S30).

Figure 11:
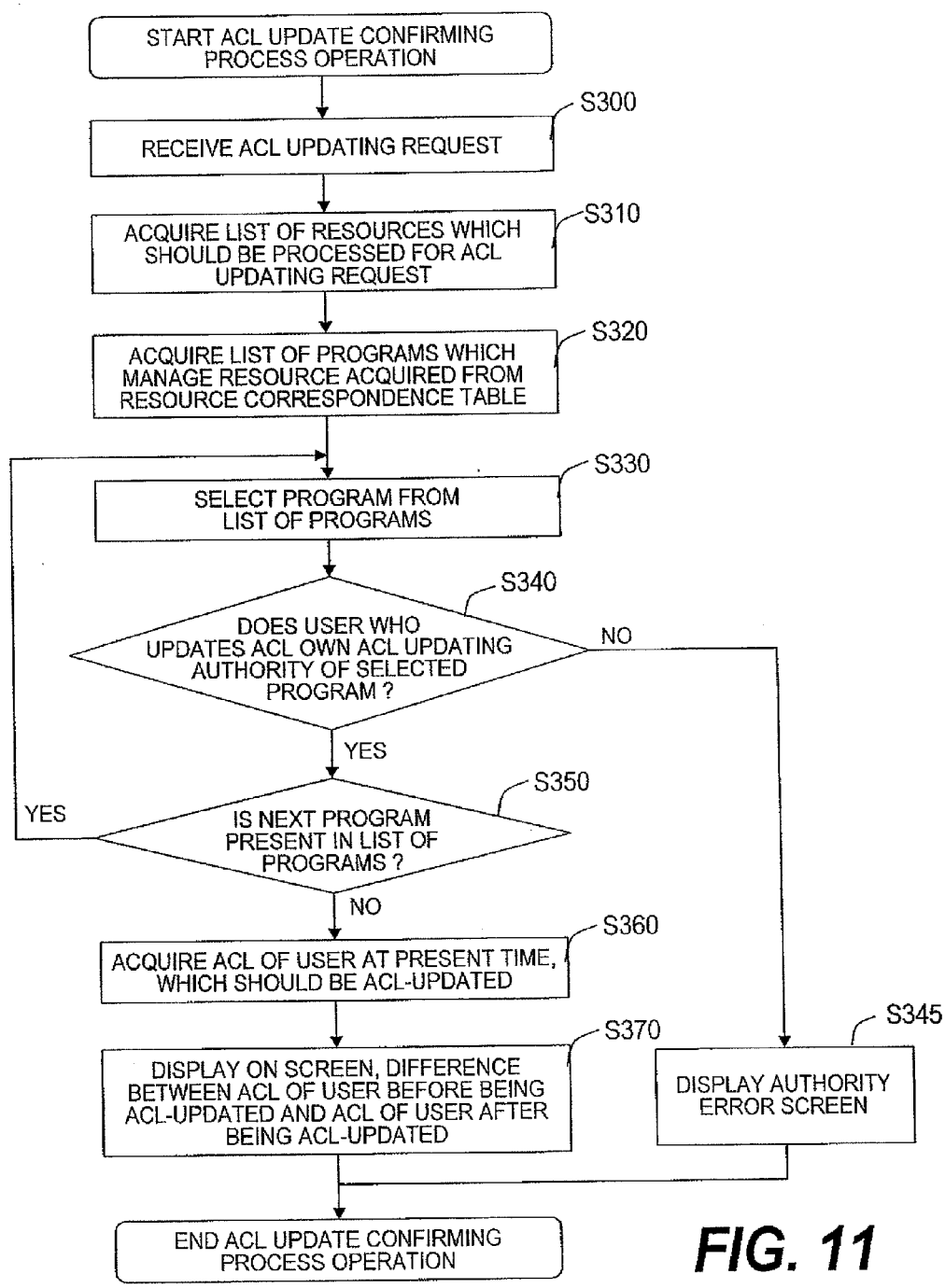
FIG. 11 is a flow chart for representing sequential operations after the system administrator requests an ACL updating operation until an update confirmation is notified by the management program Pa1 according to the first embodiment.
Figure 12:
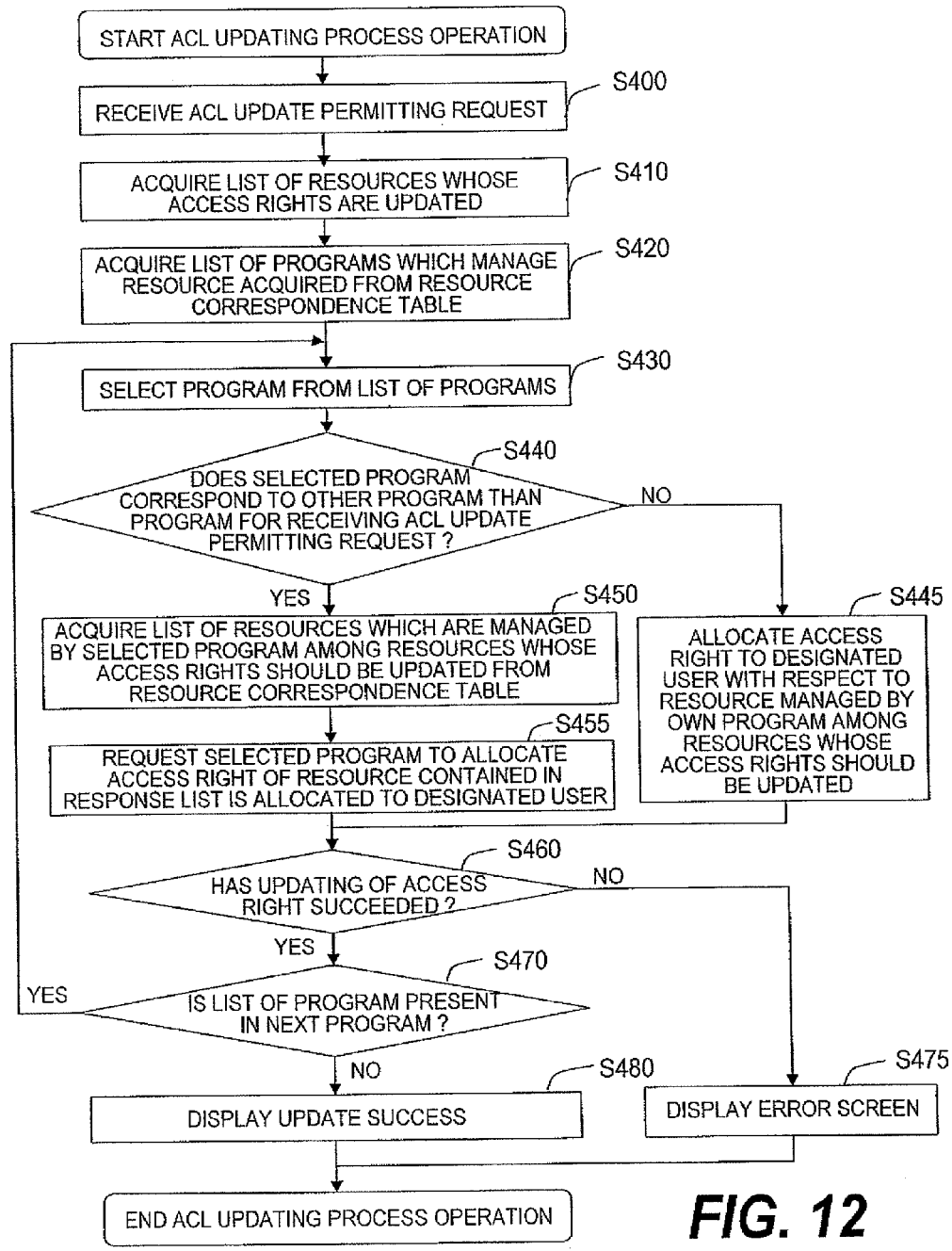
FIG. 12 is a flow chart for showing sequential operations after the system administrator confirms an update content of an ACL until the updating process operation is accomplished according to the first embodiment.

Subsequently, a description is made of a detailed sequence as to the process operation by which the management program Pa1 updates the ACL (Ta1), and also, updates an ACL in interconnection with the above-explained updating of the ACL (Ta1), which is contained in the management program for managing a resource related to the resource to be updated. As explained in FIG. 10, this process operation is arranged by a confirmation process operation and an update process operation. Referring now to FIG. 11 and FIG. 12, the respective process operations will be explained in detail.

FIG. 11 is a flow chart for representing sequential operations after the system administrator of the first embodiment requests an ACL updating operation until an update confirmation is notified by the management program Pa1. The flow chart shown in FIG. 11 corresponds to the sequential operations defined by Step S20 to Step S24 in FIG. 10.

When the management program Pa1 receives an ACL updating request from the system administrator (S300, namely, S20 of FIG. 10), the management program Pa1 acquires a list of resources which should be updated and are contained in the ACL updating request (S310). Then, the management program Pa1 refers to the resource correspondence table Ta3 so as to acquire a list of programs which manage the respective resources acquired in the process operation of Step S310 (S320, namely, S22 of FIG. 10).

The ACL updating requests owns the below-mentioned content. In other words, for example, the storage administrator permits an updating/referring operation with respect to a pair group 1 containing the resources A1 and B1 which constitute a copy pair. At this time, the list of resources contains A1 and B1, a1 and a2 which constitute A1, and b1 and b2 which constitute B1. Also, referring now to the resource correspondence table Ta3 of FIG. 6, the list of programs which manage the resources contains the programs B1 and B2, and the own programs (namely, management programs Pa1, Pb1, Pb2).

Next, the management program Pa1 sequentially selects the programs from a head of the program list (S330). Then, the management program Pa1 judges whether or not the system administrator who has requested the ACL updating operation owns ACL updating authority of the selected program (S340, namely, S23 of FIG. 10). The judgment as to whether or not the ACL updating request is owned may be made by referring to an ACL (Ta3) contained in the selected program.

When the system administrator owns the ACL updating authority ("YES" in result of S340), the management program Pa1 executes a similar process operation as to the remaining programs in the program list acquired in the process operation of Step S320 (S350).

When the system administrator does not have the ACL updating authority in any one of these programs ("NO" in result of S340), the management program Pa1 displays an authority error screen (S345), and accomplishes the ACL updating/confirming process operation.

When the system administrator owns the ACL updating authority in all programs which manage the resource to be ACL-updated ("YES" in result of S350), the management program Pa1 acquires an access right of a user at the present time, which should be ACL-updated, from the ACL (Ta1) (S360). Then, the management program Pa1 displays on the screen, a difference between the acquired ACL and an ACL obtained when the ACL updating request is executed (S370, namely, S24 of FIG. 10), and accepts a confirmation for confirming whether or not the ACL updating operation is carried out to the system administrator.

The first embodiment has described such a case where the user accessible resource is expanded by newly allocating the resource to the user as the ACL updating request. When the user accessible resource is decreased, a similar process operation may be alternatively carried out. Also, in the first embodiment, the authority error screen is displayed on which the user does not own the ACL updating authority in any one of the programs which manage the resources related to the ACL updating operation. Alternatively, a screen for confirming whether or not the ACL updating operation is carried out within a range of the program having the authority may be displayed.

FIG. 12 is a flow chart for showing sequential operations after the system administrator of the first embodiment confirms an update content of an ACL until the updating process operation is accomplished. The flow chart shown in FIG. 12 corresponds to the sequential operations from Step S25 to Step S30 of FIG. 10.

When the management program Pa1 receives an ACL update permission notification from an administrator (S400, namely, S25 of FIG. 10), the management program Pa1 acquires a list of resources which should be updated and are contained in the update request (S410). The management program Pa1 refers to the resource correspondence table Ta3 so as to acquire a list of programs which manage the resources to be updated (S420).

Next, the management program Pa1 sequentially selects the programs from a head of the program list (S430), and judges whether or not the selected program corresponds to any program other than the management program Pa1 (S440).

When the selected program corresponds to any program other than the management program Pa1 ("YES" in result of S440), this selected program is a subject program whose access right should be updated, and further, the management program Pa1 acquires a resource which is managed by the selected program from the resource correspondence table Ta3 (S450). For example, in the resource correspondence table Ta3 of FIG. 6, when the selected program corresponds to the program B1, the resources a1 and a2 are acquired.

The management program Pa1 sends an ACL updating request to the selected program in order to allocate the access right of the resource acquired in the process operation of the Step S450 to a user whose access right should be updated (S455). When the selected program manages the ACL by the resource group, the management program Pa1 issues a resource group forming request to be ACL-updated to the selected program, and thereafter, sends the ACL updating request in order to allocate this resource group. At this time, when the resource group has already been allocated to the user for constituting the subject, the management program Pa1 releases this allocation, and transmits an updating request in order to allocate a new resource group. As to the resource group whose allocation has been released, it is so assumed that when this resource group is not utilized by other ACLs, this resource group is deleted. It should also be noted that as to a deletion of a resource group, a decision of the deletion may be determined in accordance with another algorithm.

On the other hand, when the selected program is the own program ("NO" in result of S440), the management program Pa1 updates the ACL (Ta1) in such a manner that the resource contained in the resource list acquired in the process operation of Step S5410 is allocated to the designated user (S445, namely, S27 of FIG. 10).

Subsequently, the management program Pa1 judges whether or not updating of the ACL has succeeded (S460). When the ACL updating operation has succeeded ("YES" in result of S460), the management program Pa1 executes a similar ACL updating process operation with respect to all of programs contained in the program list (S470, namely, S28 and S29 of FIG. 10). Then, when all of the ACL updating process operations are accomplished, the management program Pa1 notifies the success of the updating operations to the management client 60, and displays an update success screen on the management client 60 (S480).

When the ACL updating operation fails ("NO" in result of S460), the management program Pa1 notifies an update failure to the management client 60, and displays an error screen in the management client 60.

The first embodiment indicates such an arrangement that the ACL interconnecting module Ma3 is included in the management program Pa1. Alternatively, it may be arranged such that an access right interconnection management program Pc1 (management program C) for interconnecting the ACLs among the respective programs may be independently provided.

Figure 13:
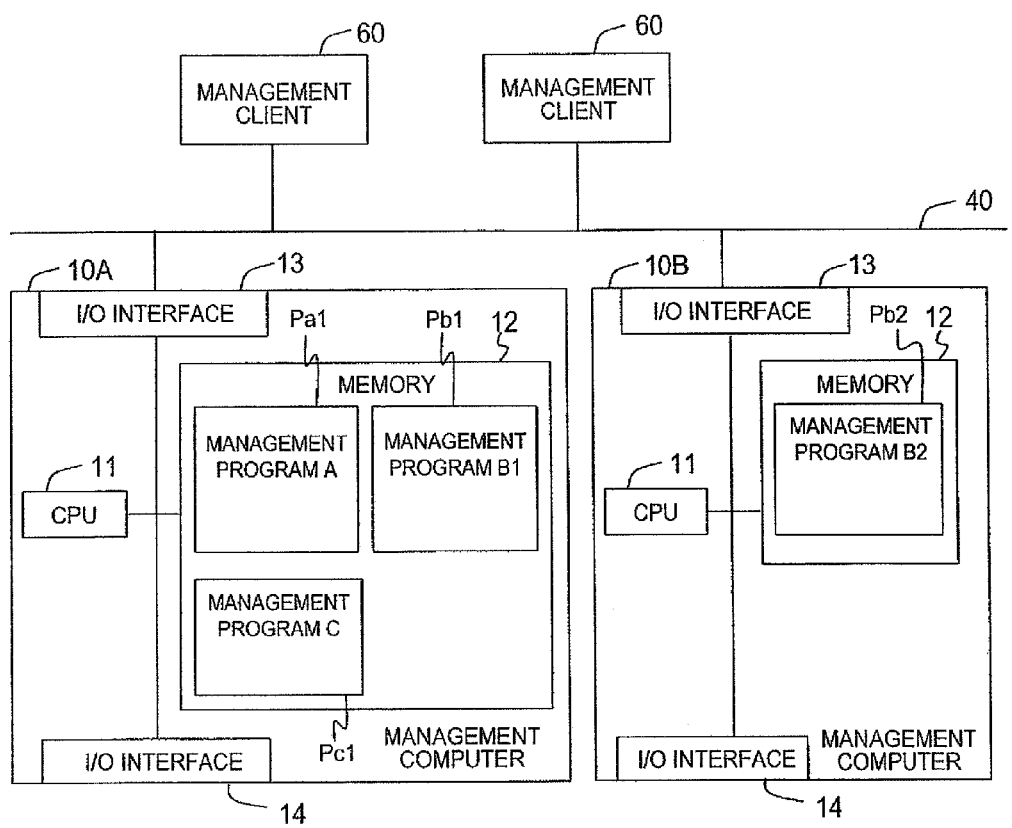
FIG. 13 is a diagram for showing an arrangement of a computer system in which the access right interconnection management program is independently provided according to the first embodiment.

FIG. 13 is a diagram for showing an arrangement of a computer system in which the access right interconnection management program Pc1 of the first embodiment is independently provided. In the arrangement shown in FIG. 13, the ACL interconnecting module Ma3 contained in the management program Pa1 employed in the arrangement of FIG. 1 is independently provided as the access right interconnection management program Pc1. It should also be understood that other structures of the above-explained computer system are identical to those of FIG. 1.

Since the access right interconnection management program Pc1 is independently provided as explained above, the respective management programs may commonly use the access right interconnection function.

Figure 14:
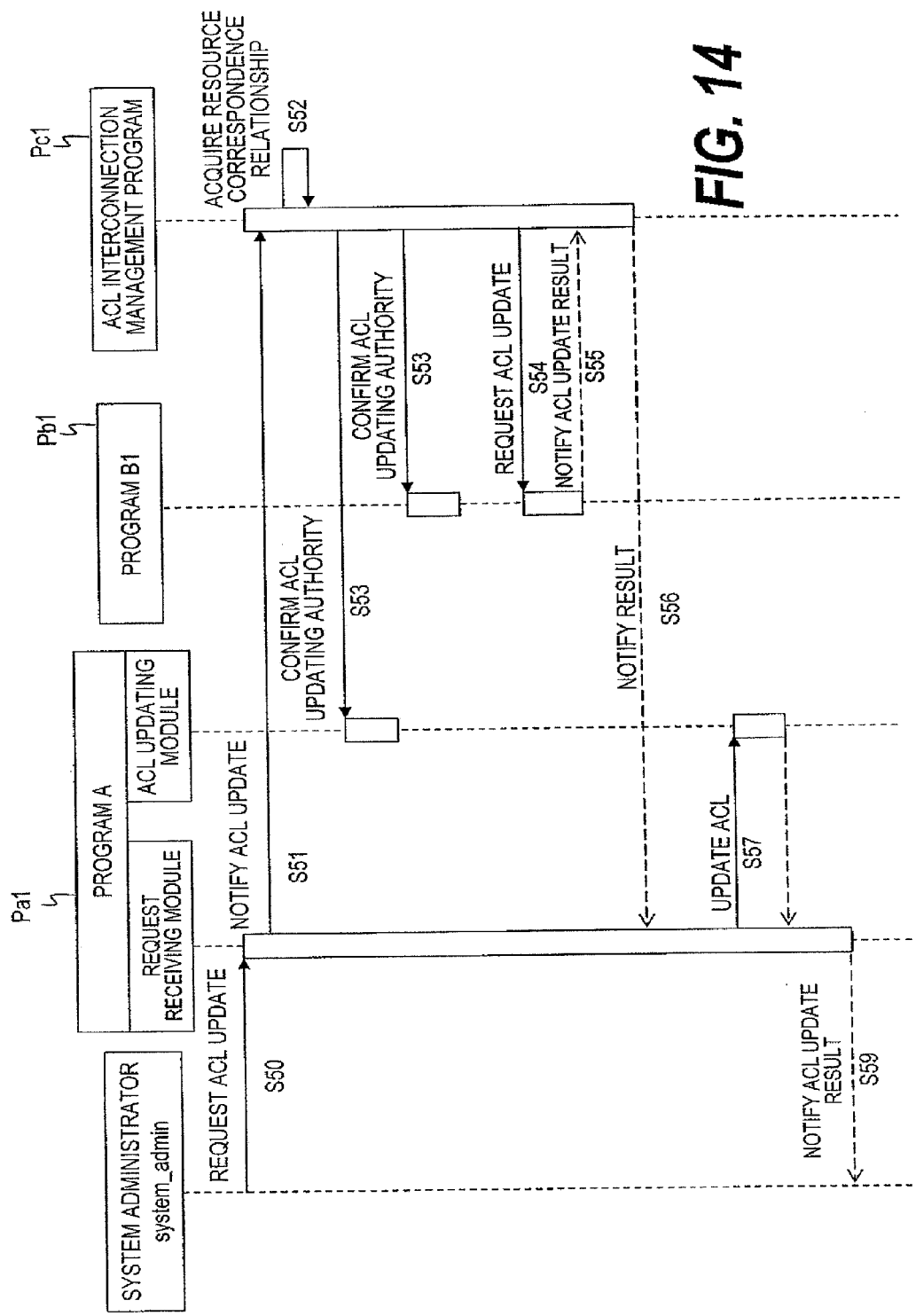
FIG. 14 is a sequential diagram for explaining a process operation for updating the ACLs of the respective management programs by the access right interconnection management program according to the first embodiment.

FIG. 14 is a sequential diagram for explaining a process operation for updating the ACLs of the respective management programs by the access right interconnection management program Pc1 of the first embodiment.

When the management program Pa1 receives an ACL updating request by the request receiving module Ma1 (S50), the management program Pa1 notifies an ACL updating request to the ACL interconnection management program Pc1 (S51).

The ACL interconnection management program Pc1 acquires a resource which should be updated and is contained in the ACL update notification, and a management program which manages the resource to be updated from the resource correspondence table Ta3 (S52). In this case, both the management programs Pa1 and Pb1 correspond to the management program for managing the resource to be updated.

Next, the ACL interconnection management program Pc1 confirms whether or not the system administrator owns such authority of allocating an access right to the storage administrator with respect to the own program and the respective management programs (S53). When the system administrator owns the ACL updating authority, the ACL interconnection management program Pc1 requests both the management programs Pa1 and Pb1 to update the ACLs thereof (S54).

When the ACL interconnection management program Pct receives such a notification that the updating operation of the ACL in the management program Pb1 of the ACL update request destination has been completed (S55), the ACL interconnection management program Pc1 notifies an ACL updating result to the management program Pa1 corresponding to the request source program (S56). Finally, the management program Pa1 updates the ACL (Ta1) (S57), and notifies the update result to the management client 60 (S59).

According to the first embodiment, when an access right with respect to a resource which is managed by a management program is updated, an access right defined in another management program which manages resources related to resources which should be managed is updated in interconnection with the above-explained updating operation of the access. As explained above, while the consistency of the access right among the management programs can be secured, cumbersome management for the access rights in connection with enlargements of storage systems and increases of management programs can be reduced, and lowering of security levels can be suppressed.

Second Embodiment

In a second embodiment of this invention, when resources which constitute a pair are managed by a plurality of programs, an ACL is updated in interconnection with these multiple programs. It should be understood that a different point of the second embodiment from the first embodiment will be mainly explained, and common items to the first embodiment will not be explained.

Figure 15:
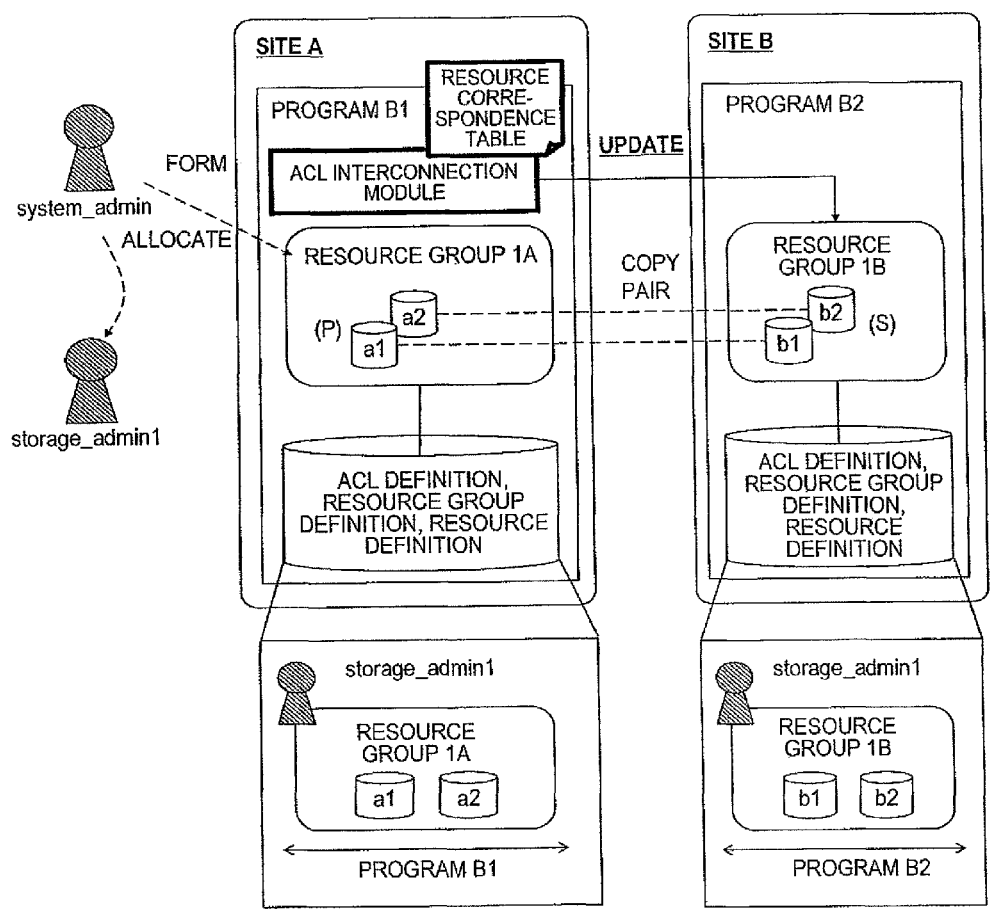
FIG. 15 is a diagram for schematically indicating a process operation for setting an access right according to a second embodiment of this invention.

FIG. 15 is a diagram for schematically indicating a process operation for setting an access right according to the second embodiment. In the second embodiment, a structure management program Pb1 is stored in a site A and another structure management program Pb2 is stored in a site B, while the structure management programs Pb1 and Pb2 manage structures of storage resources provided by the storage system 20.

While logical volumes "a1" and "b1", and logical volumes "a2" and "b2" are constituted as copy pairs, which are provided by the storage system 20, the volumes "a1" and "a2" construct a primary volume, whereas the volumes "b1" and "b2" constitute a secondary volume. The management problem Pb1 manages the primary volume. The management program Pb2 manages the secondary volume.

The process operation will now be summarized. In other words, when a system administrator (system_admin) sets an access right to a storage administrator (storage_admin1) with respect to the primary volume, the system administrator also sets an access right with respect to the corresponding secondary volume in interconnection with the above-described setting operation of the access right.

FIG. 16 is a diagram for explaining a structure of a resource correspondence table Tb7 contained in the management program Pb1 of the second embodiment. The resource correspondence table Tb7 contains a management resource Tb71 of the own program, a relative resource Tb72 of an interconnection program, a program name Tb73, a host Tb74, and a domain Tb75. The respective fields of the resource correspondence table Tb7 correspond to the respective fields of the resource correspondence table Ta3 of the first embodiment.

A different point between the resource correspondence table Ta3 of the first embodiment and the resource correspondence table Tb7 is given as follows. In other words, a value of the resource Tb72 of the interconnection program constitutes an identifier of resources which constitute a pair.

Specifically speaking, in the second embodiment, as explained above, the logical volume "a1" constitutes the primary volume, whereas the logical volume "b1" constitutes the secondary volume. As a consequence, referring to a record Tb701, when the management resource Tb71 of the own program is the logical volume "a", the logical volume "b1" corresponding to the identifier of the secondary volume of the logical value "a1" is stored in the relative resource Tb72 of the interconnection program.

Figure 17:
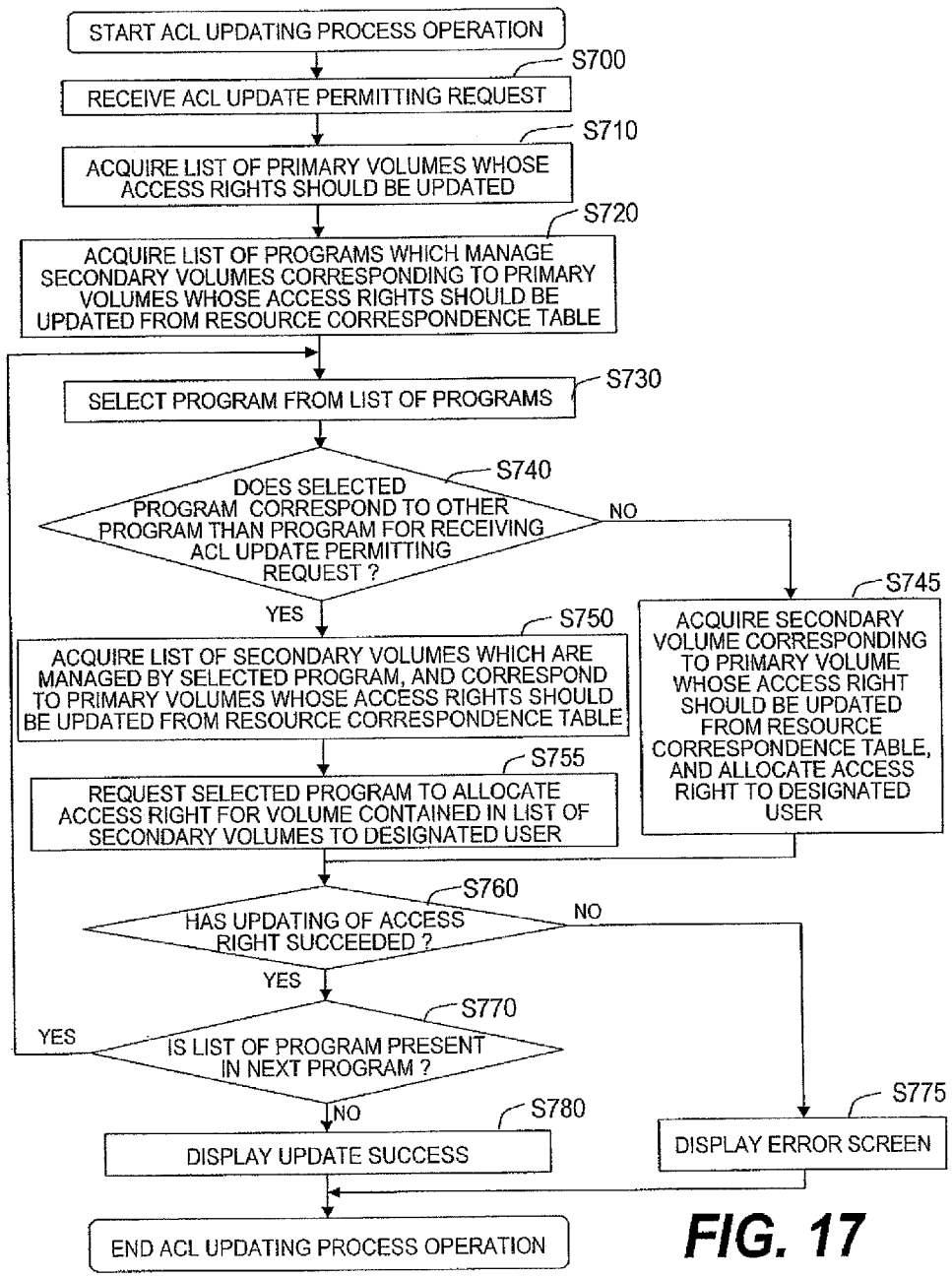
FIG. 17 is a flow chart for indicating sequences of ACL updating process operations according to the second embodiment.

FIG. 17 is a flow chart for indicating sequences of ACL updating process operations according to the second embodiment. In the second embodiment, since a confirmation process operation executed after an ACL updating request is similar to that of the first embodiment, an explanation of this confirmation process operation is omitted, and an ACL updating process operation will be explained. The flow chart of FIG. 17 corresponds to the flow chart shown in FIG. 12 of the first embodiment.

Firstly, when the management program Pb1 receives an ACL updating request for applying an access right with respect to the primary volume to the storage administrator from the system administrator (S700), the management program Pb1 acquires a list of primary volumes which should be ACL-updated from the ACL updating request (S710).

Next, the management program Pb1 refers to the resource correspondence table Tb7 so as to acquire a secondary volume corresponding to the primary volume to be updated, and acquires a list of programs which manage the acquired secondary volume (S720).

Next, the management program Pa1 sequentially selects the programs from a head of the program list (S730), and judges whether or not the selected program corresponds to any program other than the management program Pb1 (S740).

When the selected program corresponds to a program other than the management program Pb1 ("YES" in result of S740), the management program Pb1 corresponds to a primary volume whose access right should be updated, and acquires a list of secondary volumes which are managed by the selected program from the resource correspondence table Tb7 (S750).

The management program Pb1 transmits an ACL updating request to the selected program in order that the access right of the secondary volume contained in the list acquired in the process operation of Step S750 is allocated to a subject user (S755).

On the other hand, when the selected program is the own program ("NO" in result of S740), the management program Pb1 updates the ACL of the own program (S745).

Subsequently, the management program Pb1 judges whether or not updating of the ACL has succeeded (S760). When the ACL updating operation has succeeded ("YES" in result of S760), the management program Pb1 executes a similar process operation with respect to all of programs contained in the program list acquired in the process of S720 (S770). Then, when all of the ACL updating process operations are accomplished, the management program Pb1 notifies the success of the updating operations to the management client 60, and displays an update success screen on the management client 60 (S780).

When the ACL updating operation fails ("NO" in result of S760), the management program Pb1 notifies an update failure to the management client 60, and displays an error screen in the management client 60 (S775).

According to the second embodiment, when the access right of the primary volume is updated, even in such a case where the management program which manages the secondary volume is different from the management program which manages the primary volume, the access right can be updated in interconnection to the above-described access right updating operation.

While the computer, the storage area managing method in the computer, and the computer system, according to the present invention, have been described based on the respective embodiments, the above-explained embodiments of this invention are merely exemplified in order to achieve easy understandings of the present invention, but are not provided to restrict the present invention. Apparently, the present invention may be changed and modified without departing from the inventive idea and the technical scope of the present invention, and furthermore, the present invention may cover equivalents thereof.

In the respective embodiments, the ACL is updated by the management program which receives the ACL updating request. Alternatively, even when the ACL of the management program which receives the ACL updating request is not changed, the ACL of the relative management program may be updated in interconnection with the ACL of the management program which receives the ACL updating request.

Also, when the interconnecting program is executed in a site belonging to the different network, the following process method may be alternatively carried out. In other words, when the ACL updating request is issued, a confirmation is made as to whether or not security of the network is secured by SSL, or the like. Only when the security is secured, the ACL updating request may be carried out.

Further, the respective embodiments have explained such an example that the ACLs are interconnected between the different programs. Alternatively, when one program is constituted by a plurality of modules and the respective modules independently manage the access rights of the resources, since the management program is replaced by the module, the ACL may be updated in interconnection thereto.

While the present invention has been described in detail and pictorially in the accompanying drawings, the present invention is not limited to such detail but covers various obvious modifications and equivalent arrangements, which fall within the purview of the appended claims.

What is claimed is:

1. An access right management method for use in a computer system comprising a first storage system, which includes hard disk drives configuring a first logical unit managed by a first management computer coupled to the first storage system storing first management authority information, a second storage system, which includes hard disk drives configuring a second logical unit managed by a second management computer coupled to the second storage system storing second management authority information, and a third management computer coupled to the first management computer and the second management computer, storing resource correspondence information, which third management computer manages the first logical unit and the second logical unit as storage resources via the first management computer and the second management computer, said method comprising:

the first management computer managing the first logical unit as a first management resource based on the first management authority information indicating management authorities of a plurality of administrators to the first management resource, the second management computer managing the second logical unit as a second management resource, based on the second management authority information indicating management authorities of the plurality of administrators to the second management resource, the third management computer managing the storage resources based on the resource correspondence information, which indicates correspondences between the storage resources including the first logical unit and the second logical unit and management computers including the first management computer and the second management computer, the third management computer receiving a management authority update request identifying at least one certain storage resource which is one or more of the storage resources and a certain administrator which is one or more of the plurality of administrators, the third management computer selecting one of the first management computer and the second management computer, which manages the at least one certain logical unit associated with the at least one certain storage resource, and sending an update request of a management authority of the certain administrator about the at least one certain logical unit to the one of the first management computer and the second management computer, based on the resource correspondence information, and one of the first management computer and the second management computer, which receives the update request, updating the one of the first management authority information and the second management authority information about the at least one certain logical unit.

2. A method according to claim 1, wherein the at least one certain storage resource includes a port.

3. A method according to claim 1, wherein the first and second management authority information includes authority to modify and to view.

4. A method according to claim 1, wherein the at least one certain storage resource includes one or more of the first logical unit and the second logical unit, said method further comprising:

the first management computer judging execution or not execution of a management operation requested and identifying a logical unit, based on the first management authority information, and the second management computer judging execution or not execution of a management operation requested and identifying a logical unit, based on the second management authority information.

5. A method according to claim 1, wherein:

the first logical unit is allocated in the first storage system by the management of the first management computer, and the second logical unit is allocated in the second storage system by the second management computer.

6. A method according to claim 5, further comprising:

the third management computer managing a replication pair between the first logical unit and the second logical unit, as the storage resources, and storing correspondence between the replication pair and the first logical unit and the second logical unit, and wherein the at least one certain storage resource is the replication pair.

7. A method according to claim 5, wherein the at least one certain storage resource is a resource group including one or more of the first logical unit and the second logical unit.

8. A method according to claim 5, wherein one of the management authorities is a capability of reference management operation to the storage resources, and another one of the management authorities is a capability of modification management operation to the storage resources.

9. A method according to claim 4, wherein at least one of the plurality of administrators is a system administrator, and another at least one of the plurality of administrators is a storage administrator, and wherein the management authority update request is requested by the system administrator, and the certain administrator is the storage administrator.

10. A method according to claim 5, further comprising:

the third management computer storing a system management authority information indicating management authorities of the plurality of administrators to the storage resources, wherein the management authority information is created based on the management authorities indicated by the first management authorities information and the management authorities indicated by the second management authorities information.

11. A method according to claim 10, further comprising:

before the update of the one of the first management authority information and the second management authority information, the third management computer displays a management authorities difference by executing the management authority update request.

12. An access management method for used in a computer system comprising a first storage system, which includes hard disk drives configuring a first logical unit managed by a first management computer coupled to the first storage system storing first management authority information, and a second storage system, which includes hard disk drives configuring a second logical unit managed by a second management computer coupled to the second storage system and the first management computer, which stores second management authority information, and resource correspondence information, which second management computer manages the first logical unit and the second logical unit as storage resources via the first management computer and the second management computer, said method comprising:

the first management computer managing the first logical unit as a first management resource based on the first management authority information indicating management authorities of a plurality of administrators to the first management resource, the second management computer managing the second logical unit as a second management resource, based on the second management authority information indicating management authorities of the plurality of administrators to the second management resource, the second management computer managing the storage resource based on the resource correspondence information, which indicates correspondences between the storage resources including the first logical unit and the second logical unit and management computers including the first management computer and the second management computer, the second management computer receiving management authority update request identifying at least one certain storage resource which is one or more of the storage resources and a certain administrator which is one or more of the plurality of administrators, the second management computer selecting one of the first management computer and the second management computer, which manages the at least one certain logical unit associated with the at least one certain storage resource, and requesting update of a management authority of the certain administrator about the at least one certain logical unit to the one of the first management computer and the second management computer, based on the resource correspondence information, and the one of the first management computer and the second management computer, which is requested, updating the one of the first management authority information and the second management authority information about the at least one certain logical unit.

13. A method according to claim 12, wherein the at least one certain storage resource includes a port.

14. A method according to claim 12, wherein the first and second management authority information includes authority to modify and to view.

15. A method according to claim 12, wherein the at least one certain storage resource includes one or more of the first logical unit and the second logical unit, said method further comprising:

the first management computer judging execution or not execution of a management operation requested and identifying a logical unit, based on the first management authority information, and the second management computer judging execution or not execution of a management operation requested and identifying a logical unit, based on the second management authority information.

16. A method according to claim 12, wherein:

the first logical unit is allocated in the first storage system by the management of the first management computer, and the second logical unit is allocated in the second storage system by the second management computer.

17. A method according to claim 16, further comprising:

the second management computer managing a replication pair between the first logical unit and the second logical unit, as the storage resources, and storing correspondence between the replication pair and the first logical unit and the second logical unit, wherein the at least one certain storage resource is the replication pair.

18. A method according to claim 16, wherein the at least one certain storage resource is a resource group including one or more of the first logical unit and the second logical unit.

19. A method according to claim 16, wherein one of the management authorities is a capability of reference management operation to the storage resources, and another one of the management authorities is a capability of modification management operation to the storage resources.

20. A method according to claim 15, wherein at least one of the plurality of administrators is a system administrator, and another at least one of the plurality of administrators is a storage administrator, and wherein the management authority update request is requested by the system administrator, and the certain administrator is the storage administrator.

21. A method according to claim 17, further comprising:

the second management computer storing a system management authority information indicating management authorities of the plurality of administrators to the storage resources, wherein, the management authority information is created based on the management authorities indicated by the first management authorities information and the management authorities indicated by the second management authorities information.

22. A method according to claim 21, further comprising:

before the update of the one of the first management authority information and the second management authority information, the second management computer displays management authorities difference by executing the management authority update request.

* * * * *